US006452100B1

(12) United States Patent
Marcinek

(10) Patent No.: US 6,452,100 B1
(45) Date of Patent: Sep. 17, 2002

(54) ELECTRICAL ENCLOSURE HAVING SCREW TERMINALS PROTECTED BY RE-USEABLE INSULATING COVERS

(75) Inventor: Ronald E. Marcinek, Aurora, IL (US)

(73) Assignee: Siemens Energy & Automation, Apharetta, GA (US)

( * ) Notice: Subject to any disclaimer, the term of this patent is extended or adjusted under 35 U.S.C. 154(b) by 0 days.

(21) Appl. No.: 09/676,872

(22) Filed: Sep. 29, 2000

(51) Int. Cl.[7] ................................................ H02G 3/14

(52) U.S. Cl. .......................... 174/66; 174/67; 220/241; 220/242

(58) Field of Search ............................. 174/66, 67, 53, 174/65 R, 54, 138 F; 439/650, 934, 107, 782, 709, 711; 220/241, 242, 3.8

(56) References Cited

U.S. PATENT DOCUMENTS 3,283,062 A * 11/1966 D'Entremont ............ 174/66 X
3,618,804 A * 11/1971 Krause ........................ 220/3.8
3,824,555 A * 7/1974 Klein et al. ................. 439/782
3,864,005 A * 2/1975 Klein .......................... 439/812
4,146,289 A * 3/1979 Kirrish ........................ 439/431
5,147,219 A * 9/1992 Gilberts et al. .......... 174/138 F
5,944,210 A * 8/1999 Yetter ...................... 220/3.8 X

* cited by examiner

*Primary Examiner*—Dean A. Reichard
*Assistant Examiner*—Dhiru R Patel

(57) ABSTRACT

An electrical enclosure includes a re-usable cover of electrically insulative material surrounding a portion of a screw-type electrical terminal of an electric device mounted in an access panel of the enclosure. The reusable protective cover includes an integral clamp for attaching the cover to the terminal and also includes an opening for passage of a wire through the cover to the terminal. A test probe access hole is disclosed for passage of a test probe through the cover and into contact with the terminal when the cover is installed on the terminal. Embodiments of enclosures compliant with Underwriter's Laboratory Standard 508 are disclosed.

19 Claims, 6 Drawing Sheets

ELECTRICAL ENCLOSURE HAVING SCREW TERMINALS PROTECTED BY RE-USEABLE INSULATING COVERS

FIELD OF THE INVENTION

My invention is directed to enclosures for electrical equipment utilizing devices having screw-type electrical terminals.

BACKGROUND OF THE INVENTION

It has long been common practice in the design of enclosures for electrical equipment to equip the enclosure with an access panel attached to a chassis of the enclosure by hinges or fasteners in such a manner that the access panel may be opened or removed to facilitate manufacture, maintenance, and repair of the enclosure and equipment included as part of the enclosure. It has also long been a practice to mount electrical devices such as push-buttons, switches, or indicator lights in such access panels so that the electrical devices can be actuated or viewed from outside of the enclosure.

Electrical devices mounted in access panels are often equipped with screw-type wire terminals for connecting the electrical device to a wire extending out of the enclosure when the access panel is opened or removed. During assembly, maintenance, or repair of the enclosure, it is sometimes necessary to operate the enclosure with the access panel open and electrical current or voltage applied to the screw-type terminal of an electrical device mounted in the access panel.

In the past, electrical codes applicable to such enclosures did not require screw-type terminals of electrical devices mounted in access panels to be electrically insulated. During the year 2001, however, Underwriters Laboratories Standard 508 will become effective requiring that screw-type terminals on electrical devices mounted in access panels must include some sort of electrically insulative protection against inadvertent electrical contact by personnel who might come into contact with the terminals while the access panel is open.

Traditional methods of providing electrical insulation of such screw-type terminal has been accomplished by wrapping exposed metal surfaces of the terminal with electrician's tape, or encapsulating exposed metal surfaces of the terminal in an electrically insulative coating such as glyptol or RTV. These traditional methods suffer from a number of drawbacks. Applying electrical tape or such coatings is also time consuming and labor intensive, thereby driving up the cost of initial manufacture and repair or maintenance of the enclosure. Taping and coatings are also undesirable in that they provide no access to the electrical terminal for test probes of diagnostic or trouble shooting equipment, thereby making it necessary to destroy or compromise the protective covering of the terminal during troubleshooting and repair operations. Because the taping and coating cannot be removed without destroying its effectiveness, it cannot be reused, thereby necessitating a complete re-application of tape or coating after troubleshooting or repair-operations to ensure that electrical insulation protection of the terminal is maintained.

What is needed, therefore, is an improved electrical enclosure capable of meeting the requirements of UL Standard 508 and solving one or more of the drawbacks and problems recited above associated with the prior methods of insulating screwed-type terminals in enclosures subject to the requirements of UL 508.

SUMMARY OF THE INVENTION

My invention provides such an improved electrical enclosure through the use of a reusable cover of electrically insulative material for surrounding a portion of a screw-type electrical terminal of an electric device mounted in an access panel of the enclosure. My protective cover includes an integral clamp for attaching the cover to the terminal and also includes an opening for passage of a wire through the cover to the terminal.

According to one aspect of my invention, the cover is adapted to be removed or installed on the terminal regardless of whether a wire is attached to the terminal.

In some embodiments of my invention, a test probe access hole is provided for passage of a test probe through the cover and into contact with the terminal when the cover is installed on the terminal.

Some embodiments of my invention include a cover configured to cover two or more terminals. In some embodiments, the integral clamp for attaching the cover to the terminal is provided by snap tabs that grip a portion of the terminal. In other embodiments, the cover is formed of a first and a second part which clamp together to surround the terminal. Some embodiments of my invention include a cover having a flexible hinge to facilitate installation and removal of the cover.

In a preferred embodiment of my invention, the cover is formed of two or more parts capable of providing electrical protection for two or more terminals, with one of the parts of the cover being configured so that it may be cut in pieces, and the pieces interlocked to form a cover for a single terminal.

Other aspects and advantages of my invention will be apparent to those having skill in the art upon review of the attached drawings and the following detailed description.

DETAILED DESCRIPTION OF THE PREFERRED EMBODIMENT

Figure 1:
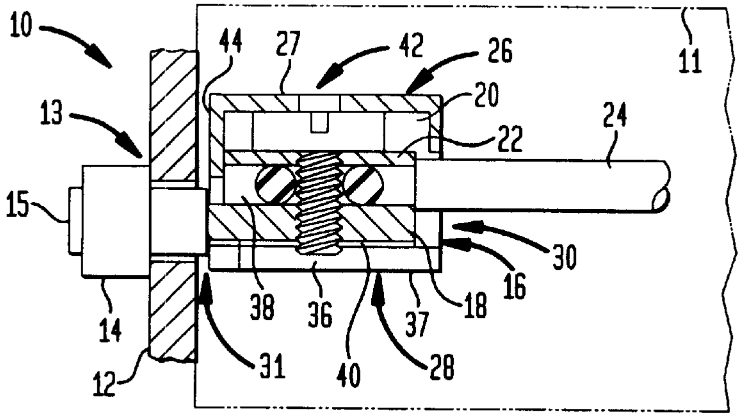
FIG. 1 depicts an exemplary embodiment of an electrical enclosure according to my invention assembled to a terminal.

FIG. 1 depicts an exemplary embodiment of an electrical enclosure 10 having a removable access panel 12 attached to a chassis 11. An electric device 14 having a pushbutton 15 is installed through an opening 13 in the access panel 12 in such a manner that a screw-type electrical terminal 16 of the electric device 14 is located within the enclosure 10 when the pushbutton 15 is located to be accessible from outside of the enclosure 10. The terminal 16 includes a fixed element in the form of a terminal blade 18 threaded to receive a screw 20, and a movable element in the form of a washer 22 for clamping a wire 24 between the fixed and movable elements 18, 22, with the screw 20 clamping the washer 22 and wire 24 against the blade 18. The movable element 22 can be provided in many forms including a simple round washer, or various shaped parts known in industry as pressure plates or saddle clamps.

A cover 26 that is in the form of a housing 27 surrounds a portion of the electric wire terminal 16. The cover 26 is formed of a generally rigid but somewhat resilient insulating material such as NYLON, or any of the many plastics conventionally used in the art. The cover 26 is configured to provide an integral clamp, generally indicated by reference numeral 28, for attaching the cover 26 to the terminal 16. The cover 26 also includes openings 30, 31 for passage of the wire 24 and the blade 18 respectively through cover 26 to the terminal 16.

Figure 2A:
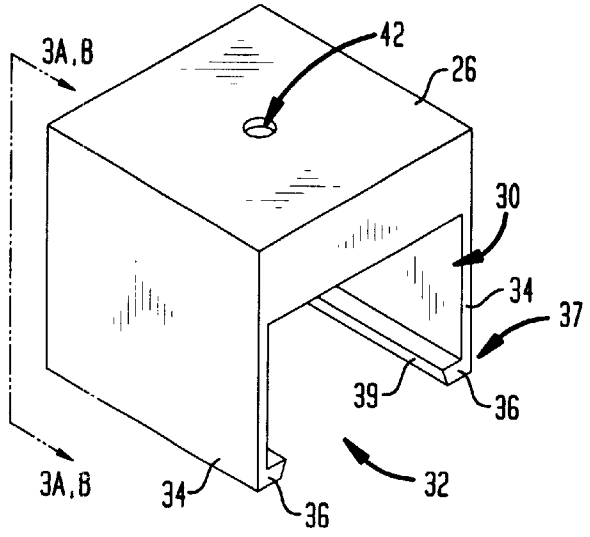
FIGS. 2*a*–8*b* depict exemplary embodiments of a cover according to my invention for a screw-type terminal, some assembled to a terminal and some not so assembled.
Figure 2B:
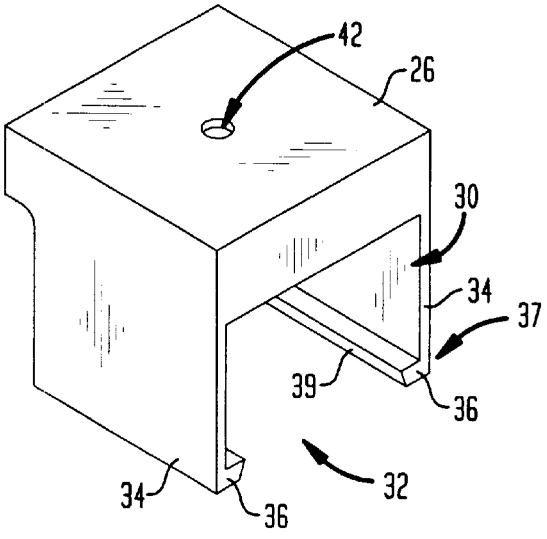
Figure 2C:
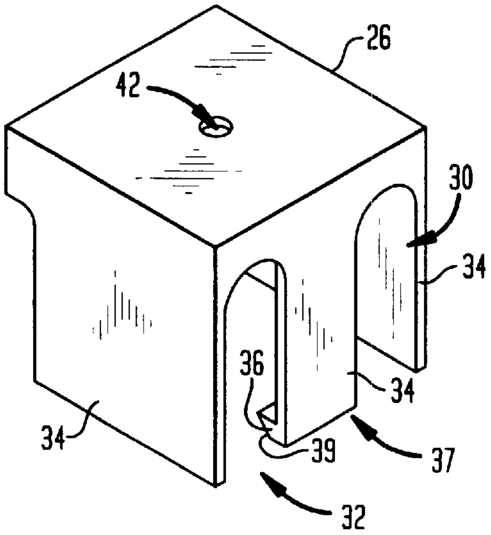

All of the embodiments depicted in FIGS. 2*a*–2*d* show a cover 26 defining a cavity 32 for receipt of the screw 20, washer 22 and a portion of the blade 18 of the terminal 16. Each of the embodiments of a cover 26 depicted in FIGS. 2*a*–2*d* includes one or more side resilient walls 34 projecting from the cavity 32 with a protruding snap tab 36 at a distal end of the side wall 34 for gripping the fixed element 18 to retain the cover 26 on the terminal 16. As shown in FIGS. 1 and 2*a*–2*c*, the snap tabs 36 have hook-like ends 37 adapted to grip the non-wire engaging surface 40 opposite a wire engaging surface 38 of the blade 18 of the terminal 16. As shown in FIGS. 2*a*–2*c*, the snap tab ends 37 also have a canted cam surface 39 to engage the surface 38 and cam the associated side wall 34 away from the blade 18 to allow the end 37 to move past the same to engage the surface 40. The snap tabs 36 in conjunction with the side walls 34 and the remainder of the cover 26 collectively provide the integral clamp 28 for attaching the cover 26 to the terminal 16.

All of the cover embodiments depicted in FIGS. 1 and 2*a*–2*d* include a test probe access hole 42 positioned for passage of a test probe through the cover 26 and into electrical contact with the terminal 16 when the cover 26 is installed on the terminal 16. The test probe access hole 42 therefore greatly facilitates initial manufacture, maintenance and repair of the electrical enclosure, in comparison with prior enclosures utilizing electrician's tape or insulative coatings on screw-type electrical terminal 16.

Figure 2D:
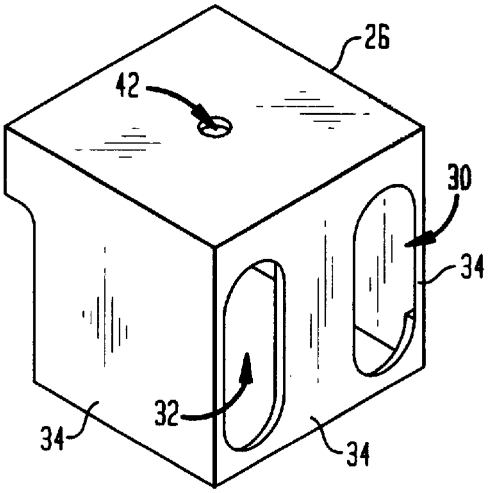

Each of the cover embodiments 26 depicted in FIGS. 1 and 2*a*–2*c* include one or more openings 30 in the form of a slot or a hole for passage of a wire through the cover for attachment to the terminal 16. Where the opening 30 is provided by an open-ended slot as depicted in FIGS. 2*a*–2*c*, the cover 26 may be installed on or completely removed from the terminal 16 regardless of whether or not a wire 24 is attached to the terminal 16. When the openings 30 for the wires 24 are provided in the form of holes 30 as depicted in FIG. 2*d*, rather than by open-ended slots 30 as shown in FIGS. 2*a*–2*c*, the cover 26 may still be installed or completely removed from a terminal to which a wire is not attached. The embodiment depicted in FIG. 2*d* cannot, however, be completely removed from the terminal 16 if a wire 24 is attached, but provides a potential advantage in some situations by ensuring that the cover 26 will be retained with the wire 24 because the wire 24 extends through the hole 30 in the cover 26. With such an arrangement as depicted in FIG. 2*d*, the cover 26 may be slid back onto the wire 24 for access to the screw 20 of the terminal 16 during installation or removal of the electric device 14, and is automatically retained on the wire 24, for reinstallation of the cover 26 following replacement of the electric device 14.

Figure 3A:
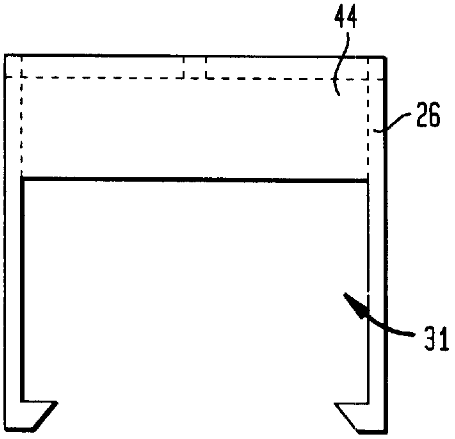
Figure 3B:
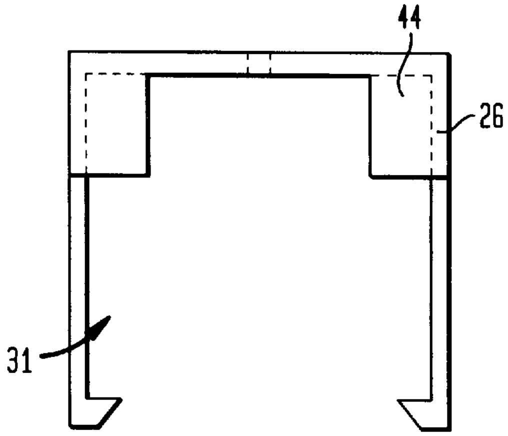

As depicted in FIGS. 2*a*–2*d*, I contemplate that there may be considerable variation within the scope of my invention in the configuration of the side walls 34, holes 30, and features of the integral clamp 28 such as the snap tabs 36. FIGS. 3*a* and 3*b* depict alternate embodiments of a cover 26 according to my invention as viewed along line 3*a*,3*b*—3*a*, 3*b* of FIG. 2*a*. FIGS. 3*a* and 3*b* illustrate that an end wall 44 of the cover 26 disposed adjacent the panel 12 may also be configured to suit the needs of a particular installation and electrical device 14 or terminal 16. For example, the end wall 44 may serve to provide additional electrical isolation of the washer 22 from the panel 12 as illustrated in FIG. 1. The end wall may also be configured to include an opening 31 shaped to match the profile of a particular terminal blade 18.

Figure 4A:
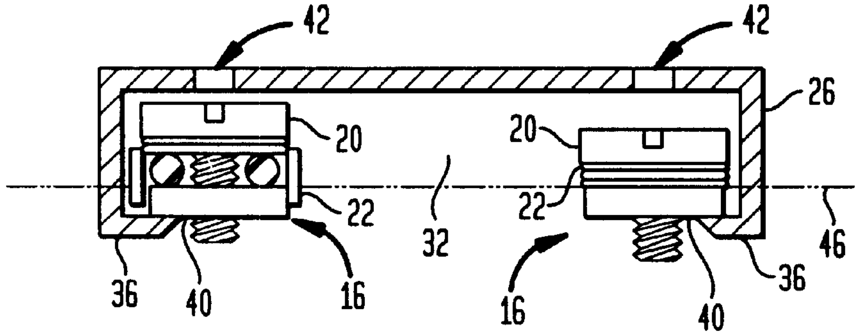
Figure 4B:
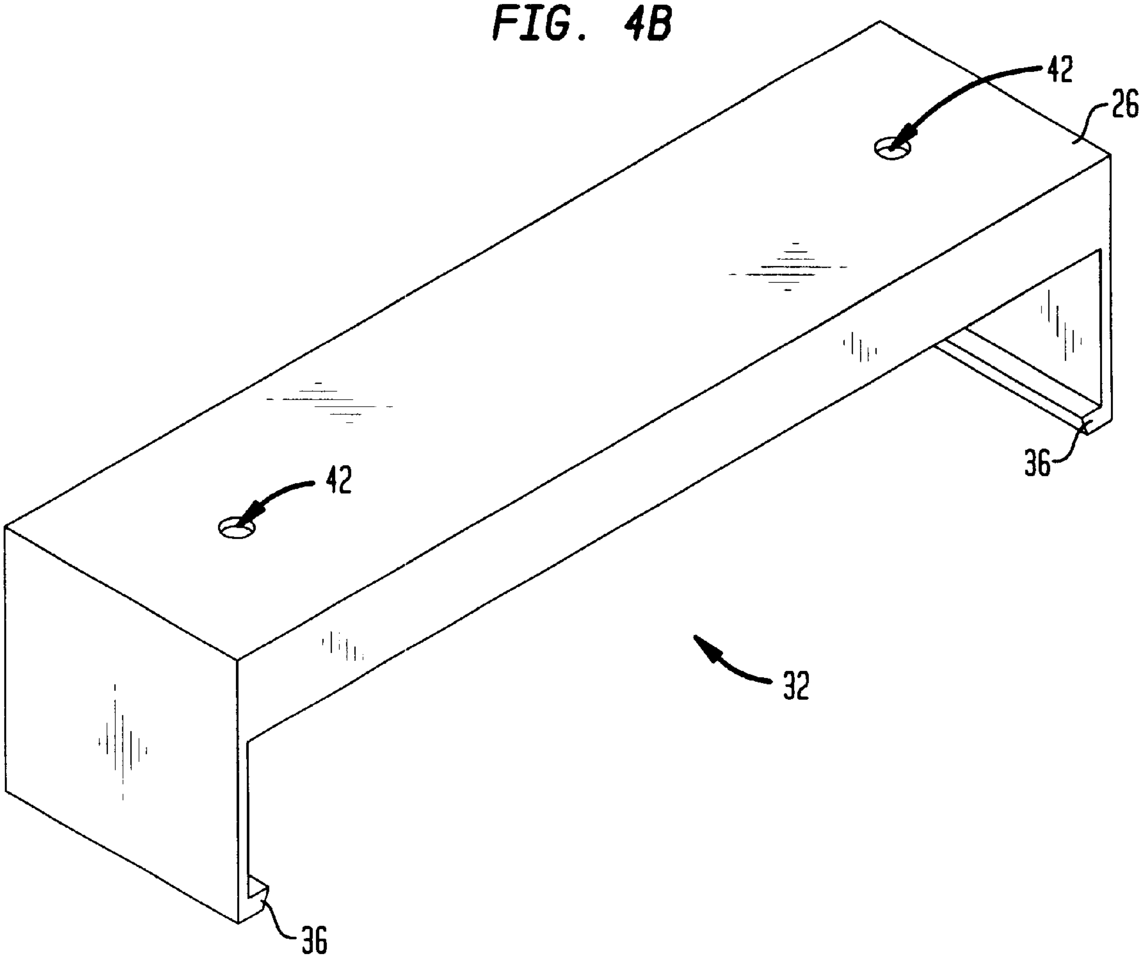

FIGS. 4*a* and 4*b* depict an embodiment of my invention in which a cover 26 defines a cavity 32 configured for receiving the screws 20 and washers 22 of two terminals 16 disposed side-by-side with their respective non-wire engaging surfaces 40 lying substantially in a common plane 46, with the cover 26 including two snap tabs 36 gripping the non-wire engaging surfaces 40 of the two terminals 16. First and second test probe access holes 42 are included to allow passage of a test probe through the cover 26 and into electrical contact with either of the terminals 16.

Figure 7:
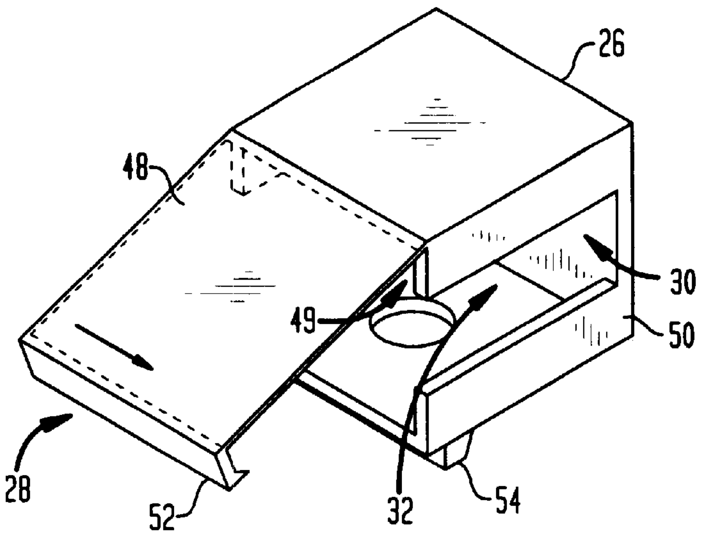

FIG. 7 depicts an embodiment of a cover 26 having an integral clamp 28 including a hinged side wall 48 projecting from a cavity 32 formed by a main body 50 of the cover 26. The hinged side wall 48 is attached to the main body 50 by a resiliently flexible hinge 49 formed integrally with the main body 50 and hinged side wall 48 by thinning the insulative material of the cover 26 along the intersection of the hinged wall 48 with the main body 50 of the cover 26. The hinge 49 allows the side wall 48 to be movable between an open and a closed position so that the cover may be installed or removed from the terminal 16. The integral clamp 28 of the cover 26 further includes an integral latch having complementary snap lock tabs 52,54 located on a distal end of the hinged side wall 48 and main body 50 of the cover 26, respectively.

Figure 6:
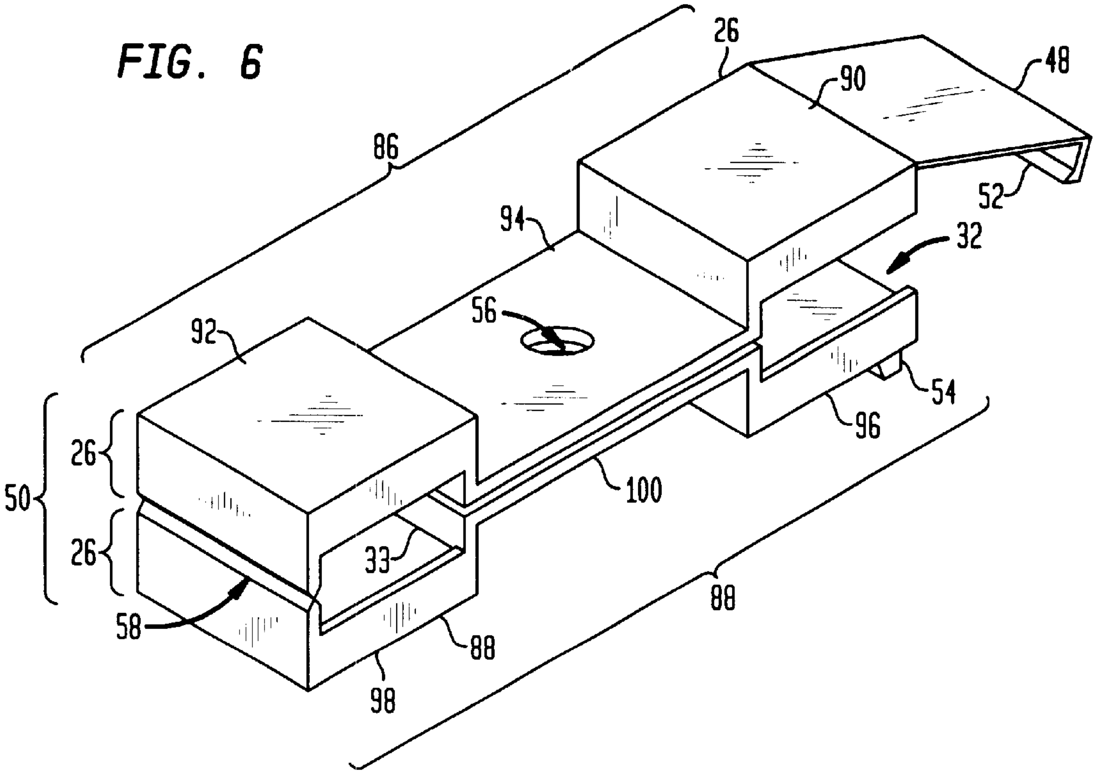

FIG. 6 depicts an embodiment of a cover 26 for protecting two screw-type terminals disposed in a side-by-side relationship similar to that depicted in FIG. 4*a*. As depicted in FIG. 6, the cover 26 includes an upper first part 86 and a lower second part 88 of a main body 50. The first and second parts 86, 88 of the cover 26 are joined at one end by a resiliently flexible hinge 58 integrally formed in the main body 50 by locally reducing the thickness of the main body 50 along a line formed by the intersection of the first and second parts 86,88 of the main body 50 of the cover 26. The hinge 58 allows the first and second parts 86,88 of the cover 26 to be spread apart during installation of the cover on or removal of the cover 26 from the side-by-side terminals 16. The end of the cover 26 opposite the hinge 58 is closed by a hinged side wall 48 extending from the first part 86 and including a snap tab 52 for engaging a complementary tab 54 extending from the second part 88 to lock the cover 26 in place on the terminals 16.

The main body 50 is further configured such that the first part 86 includes a first housing half 90 and a second housing half 92 joined by a web 94. In similar fashion, the second part 88 of the main body 50 is configured to include a first housing half 96 and second housing half 98 joined by a web 100. When the cover 26 is in a closed position, the hinge 58 aligns the first and second parts of the main body 50 in such a manner that the first housing halves 90,96 of the first and second parts 86,88 respectively are aligned to form a first cavity 32 for receipt of one of the two terminals 16, and second housing halves 92,98 are aligned to form a second cavity 33 for receiving a second terminal 16. The webs 94,100 include a complementary male and female halves (not shown) of a conventional snap stake latch 56 forming part of the integral clamp 28 and facilitating alignment of the first and second parts 86,88 of the cover 26.

Figure 8A:
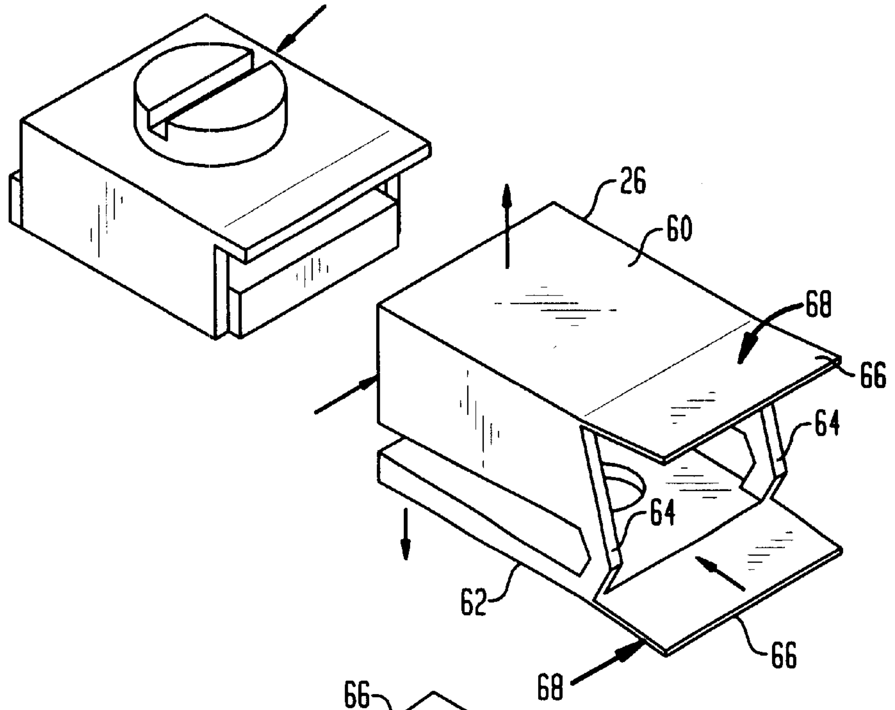
Figure 8B:
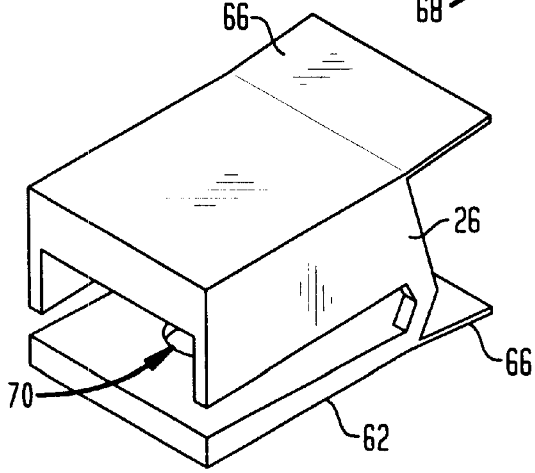

FIGS. 8*a* and 8*b* depict an embodiment of a cover 26 according to my invention having first and second cover members 60,62 connected by flexible segments 64 configured for allowing the first and second cover members 60,62 to be flexed apart during installation of the cover 26 on or removal of the cover 26 from the terminal 16. Integral lever wings 66 that may be gripped between the finger and thumb facilitate flexing of the first and second members 60,62 by applying pressure to the lever wings 66 as indicated by arrows 68. A screw clearance hole 70 is provided in the second member 62.

Figure 5A:
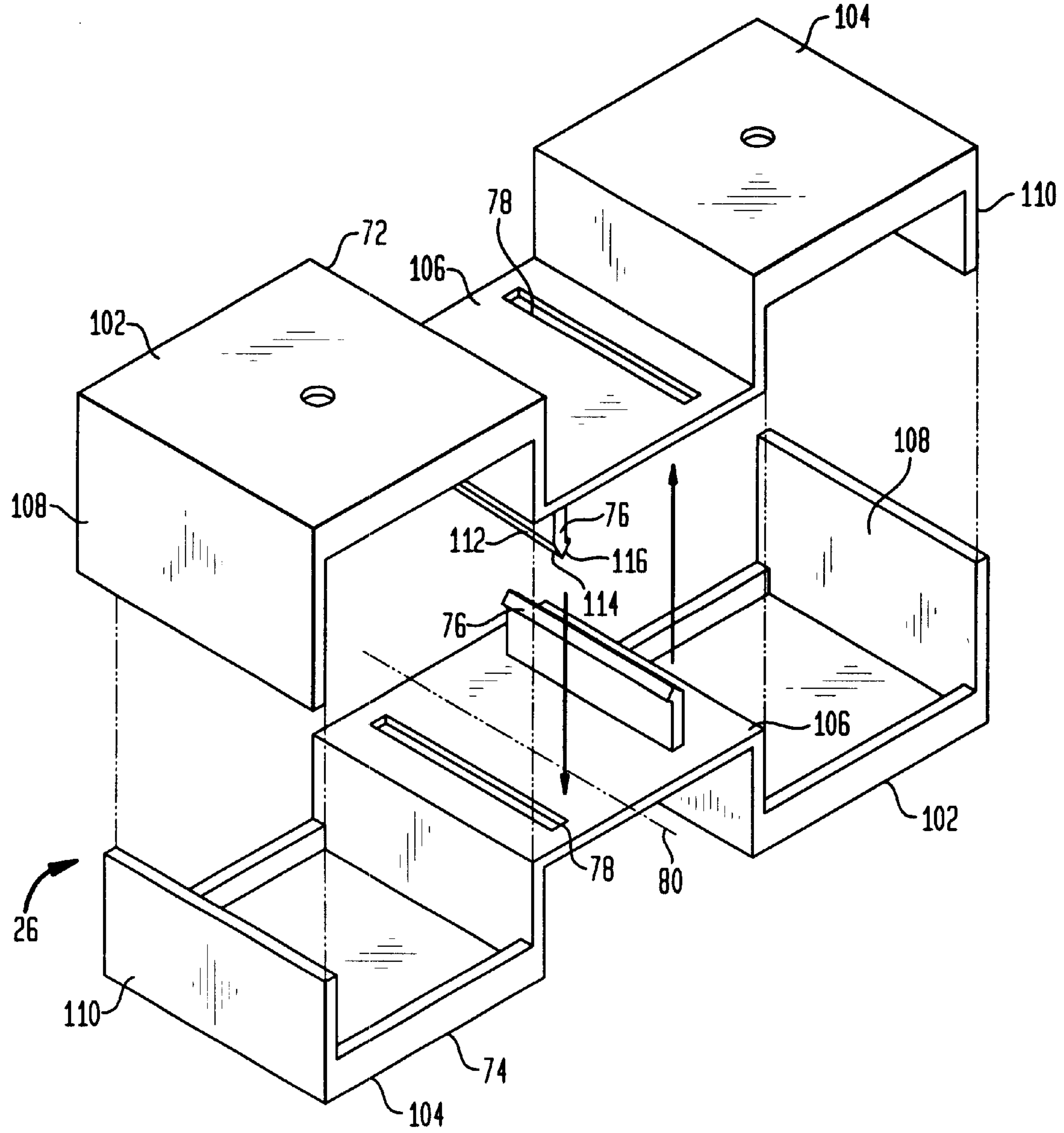
Figure 5B:
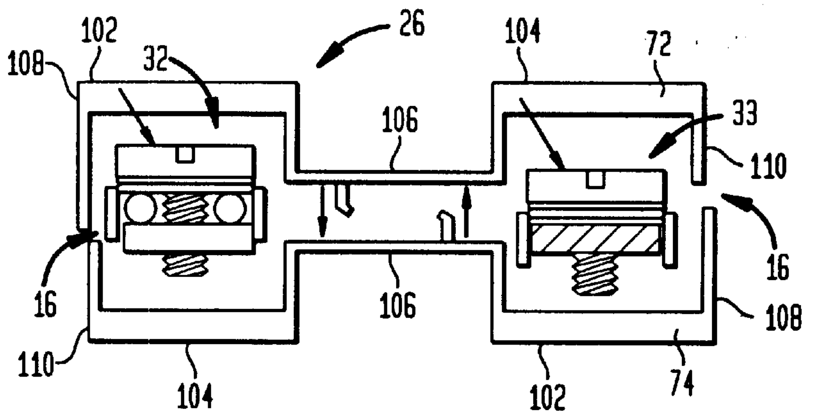
Figure 5C:
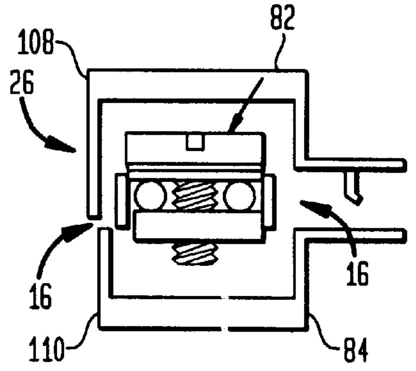

FIGS. 5*a*–5*c* depict an embodiment of my invention in which a cover 26 is provided for two screw terminals 16 arranged in a side-by-side fashion through utilization of identical first and second parts 72,74 to form the cover 26. The first and second parts 72,74 include interlocking snap tabs 76 and slots 78 as part of the integral clamp formed by the cover 26. The first and second parts 72,74 each include a first housing half 102 and a second housing half 104 joined by a web 106. The outer ends of the first and second housing halves 102,104 are respectively configured as a long wall 108 and a short wall 110 so that when the first and second parts 72,74 are assembled about the two terminals 16 in an offset nested fashion as depicted in FIG. 5*b*, the first and second parts 72,74 can be offset by a distance equal to approximately one wall thickness of the short and long walls 108,110 and nested together to form the clamp 26 and provide a first cavity 32 about one of the terminals 16 and a second cavity 33 about the second terminal 16.

The distal ends of the snap tabs 76 are configured to form a locking barb 112 having angled faces 114 and 116 to facilitate alignment and passage of the snap tabs 76 through the slots 78. In a preferred embodiment of a cover 26, the snap tabs 76 and slots 78 are configured to be resiliently flexible enough to withstand multiple engagements and disengagement so that the cover 26 is reusable.

As shown in FIG. 5*c*, the embodiment depicted in FIGS. 5*a* and 5*b* provides an additional advantage in that either the first or second part 72,74 of the cover 26 may be cut into a first and second piece 82,84 along a line as indicated at 80, in FIG. 5*a*, between the snap tab 76 and slot 78, and the first and second pieces 82,84 interlocked together to provide a cover for a single terminal 16.

Although I have described certain exemplary embodiments of my invention in the description above and attached drawings, those having skill in the art will recognize that many other alternate embodiments of my invention are possible and contemplated by me within the scope of the appended claims.

What is claimed is:

1. A removable protective cover for an electric wire terminal having a fixed element threaded to receive a screw, and a movable element for clamping a wire between said fixed and movable elements, wherein said screw clamps said movable element and wire against said fixed element, said cover including a housing of resilient insulating material surrounding a portion of said electric wire terminal and including an integral clamp for attaching the cover to said terminal, said cover also including a first opening for passage of said wire through the cover to said terminal and a second opening for passage of said portion of said terminal through said cover.

2. The cover of claim 1 wherein said first and second openings are open-ended slots, thereby allowing said cover to be removed or installed on said terminal regardless of whether said wire is attached to said terminal.

3. The cover of claim 1 having a cavity for receipt of said screw and movable element, and wherein said integral clamp includes side walls projecting from said cavity with protruding snap tabs at a distal end of said side walls for gripping said fixed element, to thereby retain said cover on said terminal.

4. The cover of claim 3 wherein said fixed element includes a wire engaging surface facing said fixed element and a non-wire engaging surface opposite said wire engaging surface, and wherein said snap tabs are adapted for gripping said non-wire engaging surface of said fixed element.

5. The cover of claim 4 wherein said cavity is configured for receiving the screws and movable element of two of said terminals disposed side-by-side with said non-wire engaging surfaces of the fixed elements of said first and second terminals lying substantially in a common plane, and wherein said cover includes two snap tabs one gripping the non-wire engaging surface of the fixed element of said first terminal, and the other of said snap tabs gripping the non-wire engaging surface of the fixed element of the second terminal.

6. The cover of claim 5 including a test probe access hole positioned for passage of a test probe through the cover and into electrical contact with one of said terminals when the cover is installed on the terminals.

7. The cover of claim 5 including a first test probe access hole positioned for passage of a test probe through the cover and into electrical contact with one of the two terminals when the cover is installed on the terminals, and a second test probe access hole positioned for passage of a test probe through the cover and into electrical contact with the other of said two terminals when the cover is installed on the terminal.

8. The cover of claim 1 including a test probe access hole positioned for passage of a test probe through the cover and into electrical contact with the terminal when the cover is installed on the terminal.

9. The cover of claim 1 having a cavity for receipt of said terminal, and wherein said integral clamp includes a hinged side wall projecting from said cavity movable between an open and a closed position, said open position allowing the cover to be installed on or removed from the terminal, said cover and hinged side wall further comprising a latch for latching said hinged side wall in said closed position.

10. The cover of claim 9 wherein said cover includes a main body with said hinged side wall hinged thereto, and wherein said latch comprises complementary snap lock tabs on the distal end of said hinged side wall and on said main body of the cover.

11. The cover of claim 9 including one or more cavities for receiving two or more terminals.

12. The cover of claim 1 wherein said cover includes a main body forming said cavity, and a hinged wall attached to said main body by a resiliently flexible hinge for moving said hinged wall from an open position for installation of said cover on or removal of said cover from said terminal.

13. The cover of claim 1 having a first and a second member connected by flexible segment configured for allowing said first and second members to be flexed apart during installation of the cover on or removal of the cover from said terminal.

14. The cover of claim 13 including an integral lever wing on each of said first and second members for facilitating flexing apart said first and second members.

15. The cover of claim 1 wherein said cover includes a first and a second part having integral locking means for securing said first and second parts of said cover together.

16. The cover of claim 15 wherein said first and second parts are identical.

17. The cover of claim 15 wherein said first and second parts define cavities for two or more terminals.

18. The cover of claim 17 wherein one of said first or second parts includes a web connecting said first and second cavities and sufficiently thick to be cut to form pieces of said one of said first or second parts with said pieces being interlockable with one another to form said cover for a single terminal.

19. An electrical device comprising:

an electric wire terminal including a fixed element threaded to receive a screw, and a movable element for clamping a first wire between said fixed and movable elements, wherein said screw clamps said movable element and said first wire against said fixed element;

a cover surrounding a portion of said electric wire terminal and including an integral clamp for attaching the cover to said terminal, said cover also including a first opening for passage of said wire through the cover to said terminal and a second opening for passage of said portion of said terminal through said cover; and a second wire clamped between said fixed and movable elements and extending through said first opening.

* * * * *